United States Patent [19]
Yamazaki et al.

[11] Patent Number: 5,604,537
[45] Date of Patent: Feb. 18, 1997

[54] IMAGING APPARATUS HAVING AN AUTOMATIC FOCUSING MEANS

[75] Inventors: Tatsuya Yamazaki, Tokyo; Kenji Kyuma, Kanagawa-ken; Kyoji Tamura, Kanagawa-ken; Koji Takahashi, Kanagawa-ken; Yuji Tsuda, Tokyo, all of Japan

[73] Assignee: Canon Kabushiki Kaisha, Tokyo, Japan

[21] Appl. No.: 396,879

[22] Filed: Mar. 1, 1995

Related U.S. Application Data

[63] Continuation of Ser. No. 116,333, Sep. 3, 1993, abandoned.

[30] Foreign Application Priority Data

Sep. 10, 1992 [JP] Japan .................................. 4-242076
Sep. 10, 1992 [JP] Japan .................................. 4-268169

[51] Int. Cl.⁶ .................................................. H04N 5/232
[52] U.S. Cl. ........................... 348/350; 348/346; 348/207
[58] Field of Search ..................................... 348/345, 346, 348/347, 348, 349, 350, 353, 354, 207; 354/400, 402; H04N 5/232

[56] References Cited

U.S. PATENT DOCUMENTS

| | | | |
|---|---|---|---|
| 4,545,665 | 10/1985 | Aihara | 354/402 |
| 4,739,411 | 4/1988 | Bolton | 348/346 |
| 4,788,603 | 11/1988 | Fujimura et al. | 348/376 |
| 5,031,049 | 7/1991 | Toyama et al. | 358/227 |
| 5,051,833 | 9/1991 | Tsuji | 358/227 |
| 5,101,277 | 3/1992 | Kanata | 348/349 |
| 5,128,768 | 7/1992 | Suda et al. | 348/352 |
| 5,412,487 | 5/1995 | Nishimura et al. | 348/346 |

*Primary Examiner*—Leo Boudreau
*Assistant Examiner*—Bipin Shalwala
*Attorney, Agent, or Firm*—Robin, Blecker, Daley & Driscoll

[57] ABSTRACT

An imaging apparatus makes it possible to precisely focus on an object to be photographed in each photographic mode by controlling the focusing of the object in accordance with the photographic mode.

12 Claims, 15 Drawing Sheets

| SHUTTER | GAIN (db) | F VALUE |
|---|---|---|
| 1/60 | 0 | 16 |
| 1/30 | 3 | 11 |
| 1/15 | 6 | 8 |
| 1/8 | 9 | 5.6 |
| | 12 | 4 |
| | 15 | 2.8 |
| | 18 | 2 |
| | 21 | 1.4 |

| EXPOSURE CONTROL MEANS | A — IRIS | B — AGC |
|---|---|---|
| IRIS | F16~F1.4 | F1.4 FULL APERTURE |
| AGC | 0db | 0db~18db |
| SHUTTER | NTSC 1/60 (SEC.)<br>PAL 1/50 (SEC.) | NTSC 1/60 (SEC.)<br>PAL 1/50 (SEC.) |

IRIS ———
AGC —·—·—
SHUTTER -------

FIG. 15   EXAMPLE OF DATA TABLE STRUCTURE (FULL AUTO)

| NO. | | ATTRIBUTE | | | | | | | | | |
|---|---|---|---|---|---|---|---|---|---|---|---|
| 01 | IRIS | f (Y) | THRESHOLD VALUE DEFINITION | AREA A ····· F16 ~ F1.4 COMPUTATION | | | | | | | |
| | | | | AREA B ····· F1.4 FULL APERTURE | | | | | | | |
| | | | | AREA C ····· F1.4 FULL APERTURE | | | | | | | |
| 02 | SHUTTER | f (Y) | THRESHOLD VALUE DEFINITION | AREA A ····· 1/60 (SEC.) | | | | | | | |
| | | | | AREA B ····· 1/60 ~ 1/8 (SEC.) COMPUTATION | | | | | | | |
| | | | | AREA C ····· 1/8 (SEC.) | | | | | | | |
| 03 | AGC GAIN | f (Y) | THRESHOLD VALUE DEFINITION | AREA A ····· 0dB | | | | | | | |
| | | | | AREA B ····· 0dB | | | | | | | |
| | | | | AREA C ····· 0dB ~ 18dB COMPUTATION | | | | | | | |
| 04 | AE WEIGHTING | FIXED | MAP DEFINITION | 0.5 | 0.5 | 0.5 | 0.5 | 0.5 | 0.5 | 0.5 | 0.5 |
| | | | | 0.5 | 1.0 | 1.0 | 1.0 | 1.0 | 1.0 | 1.0 | 0.5 |
| | | | | 0.5 | 1.0 | 1.0 | 1.0 | 1.0 | 1.0 | 1.0 | 0.5 |
| | | | | 0.5 | 0.5 | 0.5 | 0.5 | 0.5 | 0.5 | 0.5 | 0.5 |
| 05 | AE REFERENCE VALUE | FIXED | NUMERICAL VALUE DEFINITION | 50 [IRE] | | | | | | | |
| 06 | IMAGE QUALITY ADJUSTMENT | FIXED | CODE DEFINITION | NORMAL | | | | | | | |
| 07 | IMAGE EFFECTS PROCESSING | FIXED | CODE DEFINITION | NORMAL | | | | | | | |

IMAGING APPARATUS HAVING AN AUTOMATIC FOCUSING MEANS

This is a continuation application under 37 CFR 1.62 of prior application Ser. No. 08/116,333, filed Sep. 3, 1993 (abandoned).

BACKGROUND OF THE INVENTION

1. Field of the Invention

The present invention relates to an imaging apparatus, such as a video camera, having an automatic focusing device for automatically focusing on an object.

2. Description of the Related Art

In recent years, video apparatuses including video cameras or electronic cameras have been remarkably developed. In particular, functions, such as automatic focus (AF) or automatic exposure (AE), have come to be installed as standard functions to improve the functions and ease of operation thereof.

In one main-stream focusing method, utilizing an automatic focusing device, the sharpness of a picture is detected from among video signals obtained by an image sensor or the like by photoelectrically converting an object image, and the position of the lens for adjusting the focus (hereinafter referred to as a focus lens) is controlled so that maximum sharpness is attained.

To evaluate the sharpness, generally this method uses the intensity of high-frequency components of the video signal extracted by a band-pass filter (BPF) or the detected intensity of blur width (the width of an edge portion of the object) of a video signal extracted by a differentiation circuit or the like.

In a case where an ordinary object is photographed, the level of high-frequency components is low and the blur width is large when the object is not in focus. As the object comes into focus, the level of the high-frequency components becomes high, and the blur width becomes small. When the object is completely brought into focus, the level of the high-frequency components assumes a maximum value, and the blur width assumes a minimum value. Therefore, when the sharpness is low, the focus lens is driven as quickly as possible in the direction in which sharpness increases. As the sharpness increases, the speed at which the focus lens is driven is lowered, and the focus lens is stopped precisely at the peak of the hill representing sharpness. Such a control method is generally called the hill-climbing autofocus method (hill-climbing AF).

Since such an automatic focusing device described above is adopted, ease of operation is increased remarkably particularly in a video camera or the like in which a moving image is photographed, and the automatic focusing device has lately become indispensable.

In such a camera for converting an optical image into an electrical signal by an image sensor, the central portion of a picture is generally that area from which the sharpness necessary for hill climbing AF is to be extracted (hereinafter referred to as a focusing frame). Also, a method in which a focusing frame is varied depending upon the state of the object is known. According to this method, it is possible to bring an object located even at an end position of the picture into focus by, for example, enlarging the focusing frame.

Some automatic exposure control devices have functions for setting a shutter speed and an aperture value at predetermined values when a given object is photographed. This function is generally called a program AE. Program AE modes include a portrait mode, in which the depth of field is made shallow, so that people, in particular, or the like are photographed clearly, a sand and snow mode in which the brightness of people in a skiing area in winter or seashore in summer is intensified, and the like. The program AE function has come to be installed in most video apparatuses in order to easily obtain a more clear image.

In addition, the digitalization of circuits for processing image signals has progressed. Various new functions, for example, a close-up function for enlarging a part of a picture, have come to be routinely installed.

However, in such conventional video cameras equipped with a program AE, for example, in the case of the portrait mode of the program AE, a person's face is considered to be the prevalent object, but even if the face is in focus, the sharpness does not become very high. Therefore, when there is an object with high sharpness in the background, if such AF is performed as described above, in which a focusing frame is varied, a problem arises, for example, in that the focusing frame is automatically made larger and the focus would be brought on the background located at the edge portion of the picture.

Also, in the case of the close-up mode of the program AE, when the focusing frame is large, focus is made on an object outside of the picture, and no focus is made on the picture, which is problematical.

Automatic exposure control for realizing such a program AE is performed as described below.

FIG. 1 is a block diagram illustrating the construction of an automatic exposure control device used in the above-described conventional video camera.

Referring to FIG. 1; reference numeral 1 denotes a photographic lens; reference numeral 2 denotes as an iris for adjusting the amount of incident light which passes through the photographic lens 1; reference numeral 3 denotes an image sensor, such as a CCD, for photoelectrically converting an image which is formed by the photographic lens 1 on its image pickup plane and whose amount of light is adjusted by the iris 2; reference numeral 4 denotes a correlated double sampling circuit (CDS circuit) for reducing noise of an accumulated charge of the image sensor 3; reference numeral 5 denotes an AGC circuit for adjusting the gain of an image signal outputted from the correlated double sampling circuit 4; reference numeral 6 denotes a camera signal processing circuit for performing a predetermined signal processing on image signals outputted from the AGC circuit 5 in order to convert the signals into standardized video signals; reference numeral 7 denotes a gate circuit for dividing the picked-up picture into a plurality of pictures and gating a signal outputted from the AGC circuit 5 in order to extract image signals corresponding to a desired area; reference numeral 8 denotes an integrator for integrating each of the image signals corresponding to the inside of a specified area on the picture, which image signals are selected by the gate circuit 7, and determining the average light amount thereof; reference numeral 9 denotes an A/D converter for converting signals outputted from the integrator 8 into digital signals having a form for allowing a system control circuit 17, which will be described later, to process the signals; reference numeral 10 denotes a CCD drive circuit for controlling an accumulation operation, a reading operation and a resetting operation of the image sensor 3; reference numeral 11 denotes an iris motor for driving the iris 2; reference numeral 12 denotes an iris drive circuit for driving the iris motor 11; reference numeral 13 denotes a D/A converter for converting digital iris control signals outputted from the system control circuit 17 into analog signals; reference numeral 14 denotes an iris encoder formed of a Hall element for detecting the amount of opening of the iris 2, i.e., the aperture value, or the like; reference numeral 15 denotes an A/D converter for converting an output from the iris encoder 14 into digital signals having a form for allowing the system control circuit 17 to be able to process the signals; reference numeral 16 denotes a D/A converter for converting digital AGC control signals outputted from the system control circuit 17 into analog control signals, and supplying the signals to the AGC circuit 5; and reference numeral 17 denotes a system control circuit formed of a microcomputer for centrally controlling the entire video camera system.

In this construction, exposure control is performed by the iris 2 and the AGC circuit 5, i.e., two types of exposure control means. Also, the shutter speed is set to the same as one cycle (field period) of a vertical synchronization signal of a standard television signal (1/60 seconds in NTSC, and 1/50 second in PAL).

An explanation will be given below of specific operations of the automatic exposure control device in the video camera constructed as described above.

The amount of incident light which passes through the photographic lens 1 is controlled by the iris 2, and an optical image is formed on the image pickup plane of the image sensor 3 and photoelectrically converted by the image sensor 3. Noise in the image signals outputted from the image sensor 3 is removed by the CDS circuit 4, and the gain thereof is controlled by the AGC circuit 5. The resultant image signals are supplied to the camera signal processing circuit 6, and outputted as normalized television signals.

Next, the exposure control system for controlling exposure will be considered: luminance signals in the video signals outputted from the AGC circuit 5 are gated by the gate circuit 7; luminance signals corresponding to the inside of the focusing frame on the picture, indicating the range in which exposure control is performed, are extracted; and these signals are integrated by the integrator 8 to determine the average value, and supplied to the system control circuit 17 through the A/D converter 9. The system control circuit 17 controls the iris drive circuit 12 so that the luminance level received from the A/D converter 9 falls below a predetermined range, and controls the drive current supplied to the iris motor 11, thereby varying the aperture of the iris 2.

More specifically, when the exposure control system based on iris control is considered, a closed loop is formed such that the aperture on the iris 2 is controlled so that the luminance level of the video signals obtained by photoelectrically converting incident light which passes through the iris 2 is always kept within a predetermined range.

Also, when the exposure control system by the AGC circuit 5 is considered, a closed loop is formed, similar to the exposure control system based on the iris 2, such that the gain of the AGC circuit 5 is controlled by the system control circuit 17 so that the luminance level received by the system control circuit 17 falls below a predetermined range.

Next, actual control characteristics will be explained in more detail. FIG. 2 is a block diagram illustrating how two types of exposure control systems for the iris 2 and the AGC circuit 5 are controlled in accordance with illuminance.

In FIG. 2, the horizontal axis indicates the illuminance of the object; and the vertical axis indicates the set value of each of the exposure control systems. Each of the exposure control systems is divided into two control areas, A and B, in accordance with the object illuminance. That is, exposure control is performed by combining two exposure control systems of iris and AGC in accordance with the object illuminance.

In area A, the shutter speed is fixed to 1/60 seconds (1/50 second in PAL), and the gain of the AGC circuit 5 is fixed to 0 dB, exposure control being performed by only the iris 2. In area B, the shutter speed is fixed to 1/60 seconds (1/50 seconds in PAL), and the gain of the AGC circuit 5 is fixed to a full aperture value, exposure control being performed by only the AGC circuit 5. The above-described iris and shutter speed are each controlled, and set at predetermined values, thus realizing the above-described program AE.

In a case in which the shutter speed is changed, for example, from 1/60 seconds to 1/30 seconds, it is possible to practically realize a low-speed shutter of 1/30 seconds by a method in which the image sensor is read at a cycle of two fields to make the accumulation time twice as large. However, even if the shutter speed is changed, since it is fixed in a certain photographic mode, when inadequate-illuminance of an object to be photographed occurs, underexposure may not be compensated even if the iris 2 is fully opened. At that time, since the gain of the AGC circuit 5, necessarily increases, S/N deteriorates, deteriorating the image. Fine exposure control cannot be performed in accordance with slight changes in the photographic environments.

SUMMARY OF THE INVENTION

The present invention aims to solve the above-described problems of the prior art.

Accordingly, it is an object of the present invention to provide an imaging apparatus which is capable of preventing an object from being unfocused during the program AE mode.

To achieve the above object, according to one aspect of the present invention, there is provided an imaging apparatus, comprising: image pickup means; automatic focusing means for controlling the image pickup means so as to automatically focus on an object; mode switching means for switching the apparatus between a plurality of photographic modes; and control means for controlling the automatic focusing means in accordance with a photographic mode set by the mode switching means.

It is another object of the present invention to provide an imaging apparatus which is capable of performing exposure control without deteriorating the image quality in low illuminance.

To achieve the above object, according to another aspect of the present invention, there is provided an imaging apparatus, comprising: image pickup means, the image pickup means including photoelectric conversion means for photoelectrically converting light from an object and accumulating means for outputting the converted signals at a predetermined reading timing after the signals are accumulated for a predetermined time; light amount control means for controlling the amount of incident light to the image pickup means; accumulation time control means for continuously varying an accumulation time of the accumulation means; gain control means for controlling the level of image signals outputted from the image pickup means; and control means for controlling the light amount control means, the accumulation time control means and the gain control means cojointly with each other in accordance with a photographic mode in order to control exposure.

The above and further objects and novel features of the invention will become apparent from the following detailed description of embodiments thereof taken in connection with the accompanying drawings.

BRIEF DESCRIPTION OF THE DRAWINGS

FIG. 15 illustrates data which can be selected in each photographic mode in the third embodiment of the present invention.

DETAILED DESCRIPTION OF THE PREFERRED EMBODIMENTS

Preferred embodiments of the present invention will be explained below with reference to the accompanying drawings.

Figure 3:
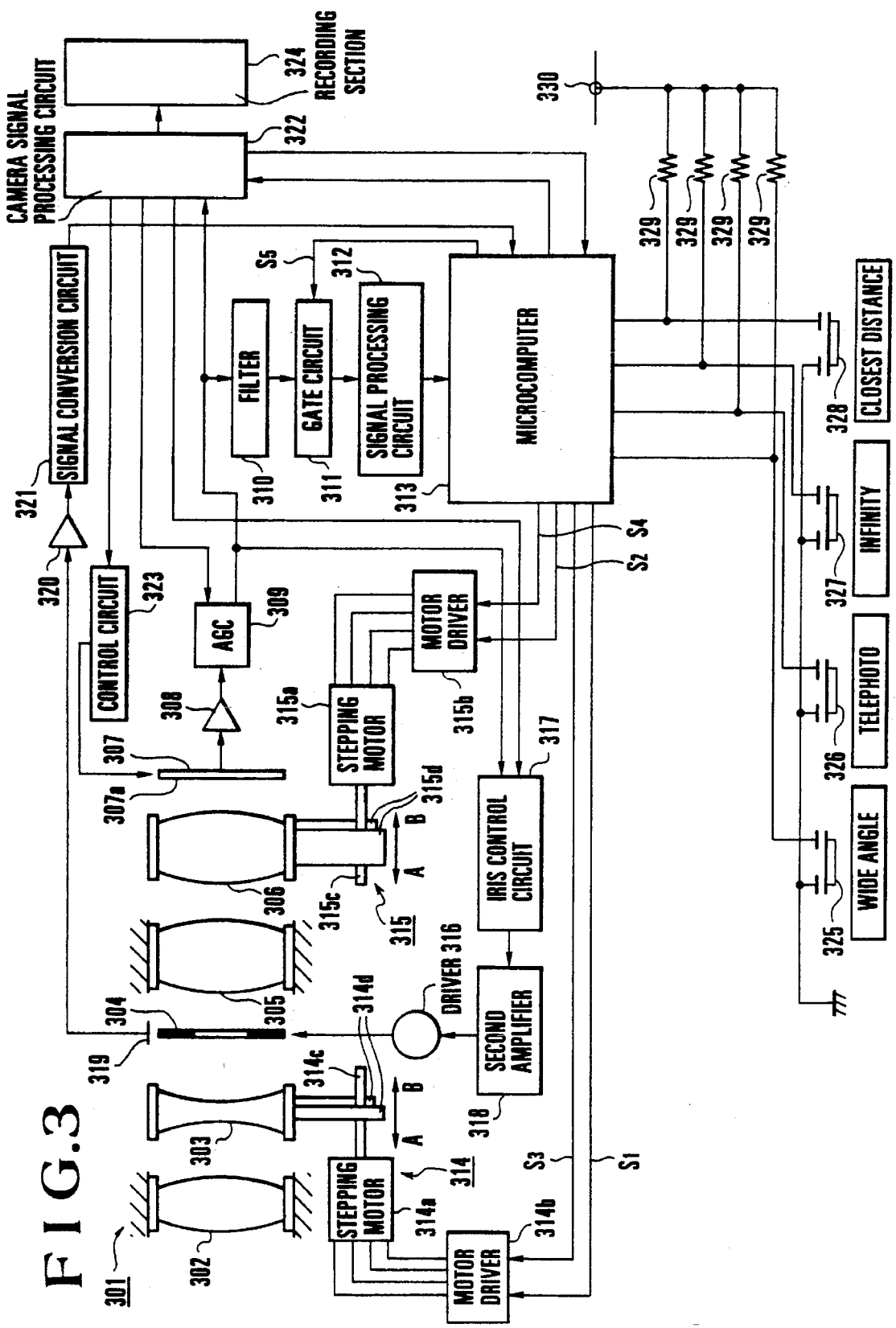
FIG. 3 is a block diagram of a video camera in accordance with a first embodiment of the present invention.

FIG. 3 is a block diagram of a video camera in accordance with the first embodiment of the present invention. In FIG. 3, reference numeral 301 denotes an innerfocus type lens system comprising a first fixed lens (front lens) 302, a variator lens (a second lens) 303 which moves in parallel to the optical axis in order to perform the variation of magnification, an iris 304, a second fixed lens 305, and a focus compensator lens (a first lens) 306 having both compensating and focusing functions, the above components being disposed in turn along the optical axis from the object side on the left in FIG. 3 toward the right thereof.

An optical object image formed by the lens system 301 is formed on the image pickup plane 307a of the image sensor (CCD) 307, and photoelectrically converted into video signals. These video signals are amplified by a first amplifier (or an impedance converter) 308, an output therefrom being amplified by an AGC (automatic gain control device) 309 and maintained at a constant level, and only high-frequency components being extracted from the output by a filter (extracting means) 310. Next, the video signals are sent to a signal processing circuit 312 for processing (producing sharpness signals) video signals used to perform AF processing via a gate circuit 311 for forming a focusing frame used to perform AF processing, and then are received by the microcomputer 313 for controlling lenses. The gate circuit 311 is controlled by the microcomputer 313, as will be describe later.

The variator lens 303 and the focus compensator lens 306 are driven by driving means 314 and 315, respectively. The driving means 314 and 315 comprise stepping motors 314a and 315a, and drivers 314b and 315b, respectively (hereinafter, the stepping motor 314a near the variator lens 303 will be referred to as a zoom motor, and the stepping motor 315a near the compensator lens 306 will be referred to as a focus motor). Racks 314b and 315b engaging with output shafts 314c and 315c which are directly connected to the zoom motor 314a and the focus motor 315a, respectively, are connected to the variator lens 303 and the focus compensator lens 306, respectively.

Control signals are outputted from the drivers 314b and 315b to the zoom motor 314a and the focus motor 315a, respectively, in accordance with a drive command signal outputted from the microcomputer 313, causing the output shafts 314c and 315c to rotate. As a result, the variator lens 303 and the focus compensator lens 306 move in parallel to the optical axis (in the direction of arrows A and B) cojointly with the racks 314d and 315d.

The iris 304 is driven by a driver 316 which is a driving means. More specifically, the level of the output signals from the AGC 309 is detected, and a control signal from the control circuit 317 for adjusting the aperture condition of the iris 304 so as to maintain that level constant is amplified by a second amplifier 318 and sent to the driver 316, whereby the iris 304 is driven.

The aperture condition of the iris 304 is detected by an encoder 319, and the signal resulting from the detection is amplifier by a third amplified 320, converted by signal conversion circuit 321 into signals having a form suitable for allowing the microcomputer 313 to read the signals, then being received by the microcomputer 313.

Reference numeral 322 denote a camera signal processing circuit which comprises a digital signal processing circuit, and a microcomputer for controlling a program AE. During a program AE mode, control signals are sent from the camera signal processing circuit 322 to a control circuit 323 for controlling the accumulation time (shutter speed) of the image sensor 307, to the AGC 309, and to a control circuit 317 for controlling the iris 304, wherein the accumulation time of the image sensor 307, the gain of the AGC 309 and the aperture value of the iris 304 are set.

During the close-up mode, a part of the picture is enlarged by the digital signal processing circuit and the camera microcomputer within the camera signal processing circuit 322, and the signals are outputted from the camera signal processing circuit 322 to a recording section 324. Information in the camera section is transmitted to the microcomputer 313 for controlling lenses through a communication line or the like.

Connected to the microcomputer 313 are a wide-angle switch 325 and a telephoto switch 326 for moving the variator lens 303 in wide-angle and telephoto directions, and an infinity switch 327 and a closest distance switch 328 for moving the focus compensator lens 306 in the direction of infinity and closest distance.

A power supply 330 is connected to the connection line between the switches 325 to 328 and the microcomputer 313 through a pull-up resistor group 329.

Figure 4:
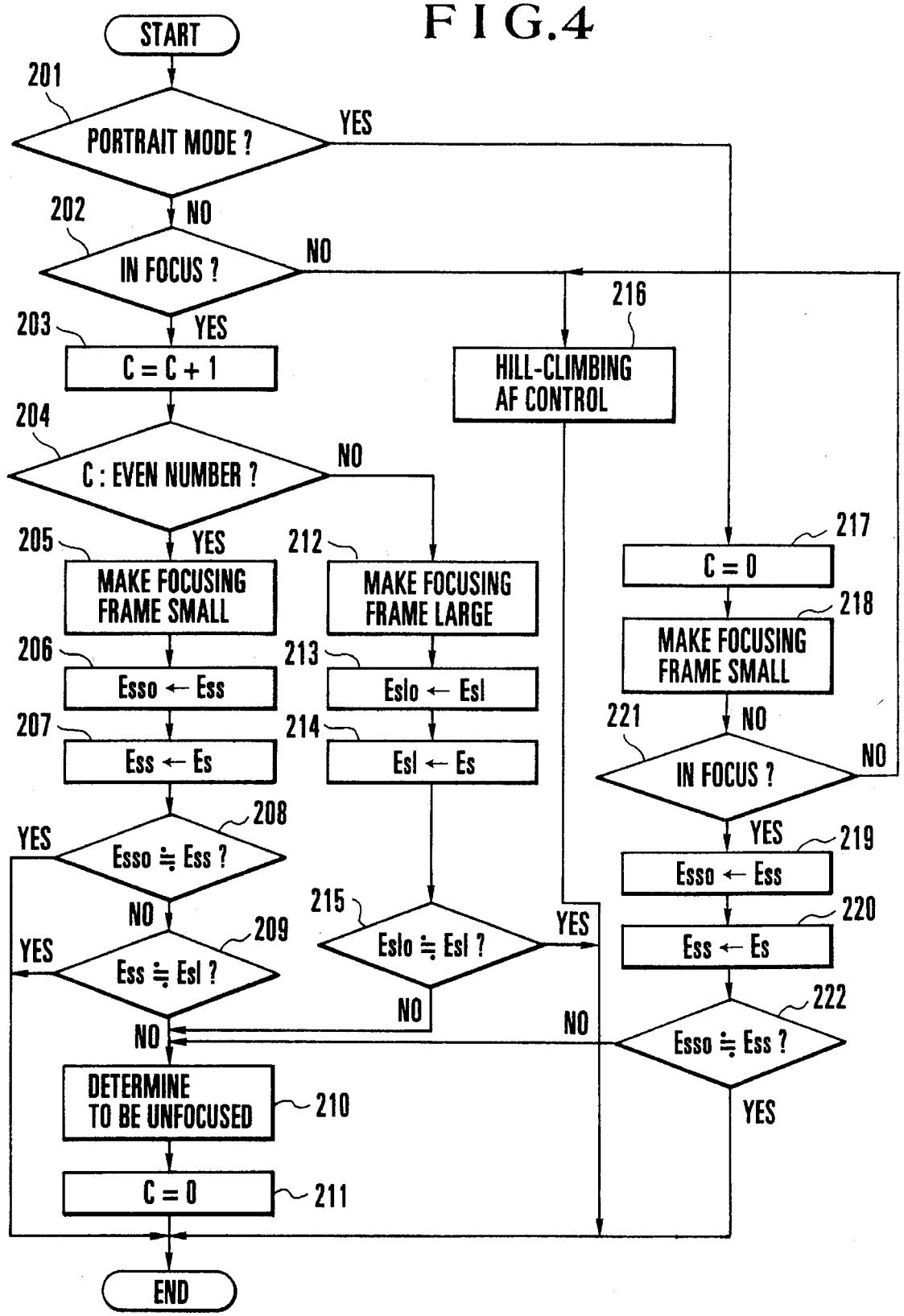
FIG. 4 is a flowchart showing the operation for controlling the video camera of FIG. 3.

Next, the video camera control apparatus constructed as described above in accordance with the first embodiment of the present invention will be explained with reference to FIG. 4. FIG. 4 is a flowchart showing the procedure for controlling the AF part of the entire video camera control. An explanation will be given here by taking the portrait mode as an example of the program AE. In the AF method of this embodiment, it is confirmed, after focusing, whether the object is focused or unfocused, or whether the object is out of the focusing frame, or whether the unfocusing is caused by the panning of the video camera itself, by switching the focusing frame between a large or small frame at a V (vertical synchronization signal) cycle.

In FIG. 4, first in step 201, a check is made to determine whether the program AE is under control in the portrait mode. If the mode is not the portrait mode, a determination is made in the subsequent step 202 whether the video camera has been focused or not. If the video camera has been focused, the process proceeds to the subsequent step 203, where the value C of a counter is incremented. Thereafter, it is determined whether the value C of the counter is an even or odd number. If the value is an even number, the process proceeds to step 205 and, if it is an odd number, the process proceeds to step 212.

In the above steps 205 and 212, the size of the focusing frame is changed. A signal for changing the size is sent from the microcomputer 313 to the gate circuit 311 through a signal line $S_5$ shown in FIG. 3, and the size of the focusing frame is changed at a V cycle, as described earlier.

In step 205, the focusing frame is made smaller. In the subsequent steps 206 and 207, Es represents a sharpness signal received on the basis of the current focusing frame; Ess represents a sharpness signal received on the basis of the small focusing frames and Esso represents a sharpness signal previously received on the basis of the small focusing frame. In step 206, the sharpness signal previously received on the basis of the small focusing frame is denoted as Esso and in step 207, the sharpness signal currently received is denoted as Ess.

In step 212, the focusing fame is made larger. Eslo in the subsequent steps 213 and 214 represents the sharpness signal previously received by the large focusing frame and Esl represents the sharpness signal received by the current large focusing frame. In step 213, the sharpness signal previously received by the large focusing frame is denoted as Eslo and in step 214, the sharpness signal received by the current large focusing frame is denoted as Esl.

In step 208, Esso is compared with Ess. When the two values are nearly equal, it is determined that the video camera is focused, and the process moves out of this flow. When Esso is not equal to Ess, Ess is compared with Esl. When Ess and Esl are nearly equal to each other, it is determined that the object moves out of the small focusing frame because the object has moved or because of the panning, and the process moves out of the flow. When Ess is not equal to Esl in step 209, it is determined that the distance to the object has changed greatly, and it is determined in the subsequent step 210 that the video camera is unfocused. In the subsequent step 211, the value C of the counter is cleared. This cause the operation to be restarted. In this case, when the process enters this flow again, since the video camera is determined to be unfocused in step 202 unless it is being zoomed, the process proceeds to step 216, where hill-climbing AF control is performed with the small focusing frame set in step 205.

In step 215, Eslo is compared with Esl. When the two values are nearly equal, it is determined that the video camera is focused, and the process moves out of the flow. When Eslo and Esl are not equal to each other, it is determined in step 210 that the video camera is unfocused. Then, the value C of the counter is cleared in step 211. This causes the process to be restarted. When the focusing frame is large, the area when the focusing frame is small is included therein. Therefore, it is not necessary to compare Ess with Esl. When these two areas are not included in each other, it becomes necessary to compare Ess with Esl, as performed in step 209. In this case, hill-climbing AF control is performed in step 216 when the process enters this flow again. The size of the focusing frame at that time becomes a large focusing frame set in step 212.

If it is determined in step 201 that the mode is the portrait mode, the process proceeds to step 217, where the value C of the counter is cleared, and the focusing frame is always made small in the subsequent step 218. Next, in step 221, a determination is made whether the video camera has been focused or not. If the video camera has not been focused, the hill climbing AF control is performed in step 216, with the focusing frame kept small. If the video camera has been focused in step 221, the sharpness signal obtained by the small focusing frame is received in steps 219 and 220. In step 222, the values Esso and Ess are compared with each other. If the two values are nearly equal, it is determined that the video camera is focused, and the process moves out of the flow. If there is a difference between the two values, the process proceeds to the step 210 to determine the video camera to be unfocused, and the process moves out of the flow.

As described above, a determination is made whether the mode is the portrait mode or not. If the focusing frame is made small on the basis of the result of this determination, the video camera focuses on the object to be photographed instead of focusing on the background or an object in the front. If a determination is made in step 201 of FIG. 4 as to whether the mode is the close-up mode or not, in terms of the program AE, it is possible to make the focusing frame small even during the close-up mode.

Next, the second embodiment of the present invention will be explained with reference to FIG. 5.

Figure 5:
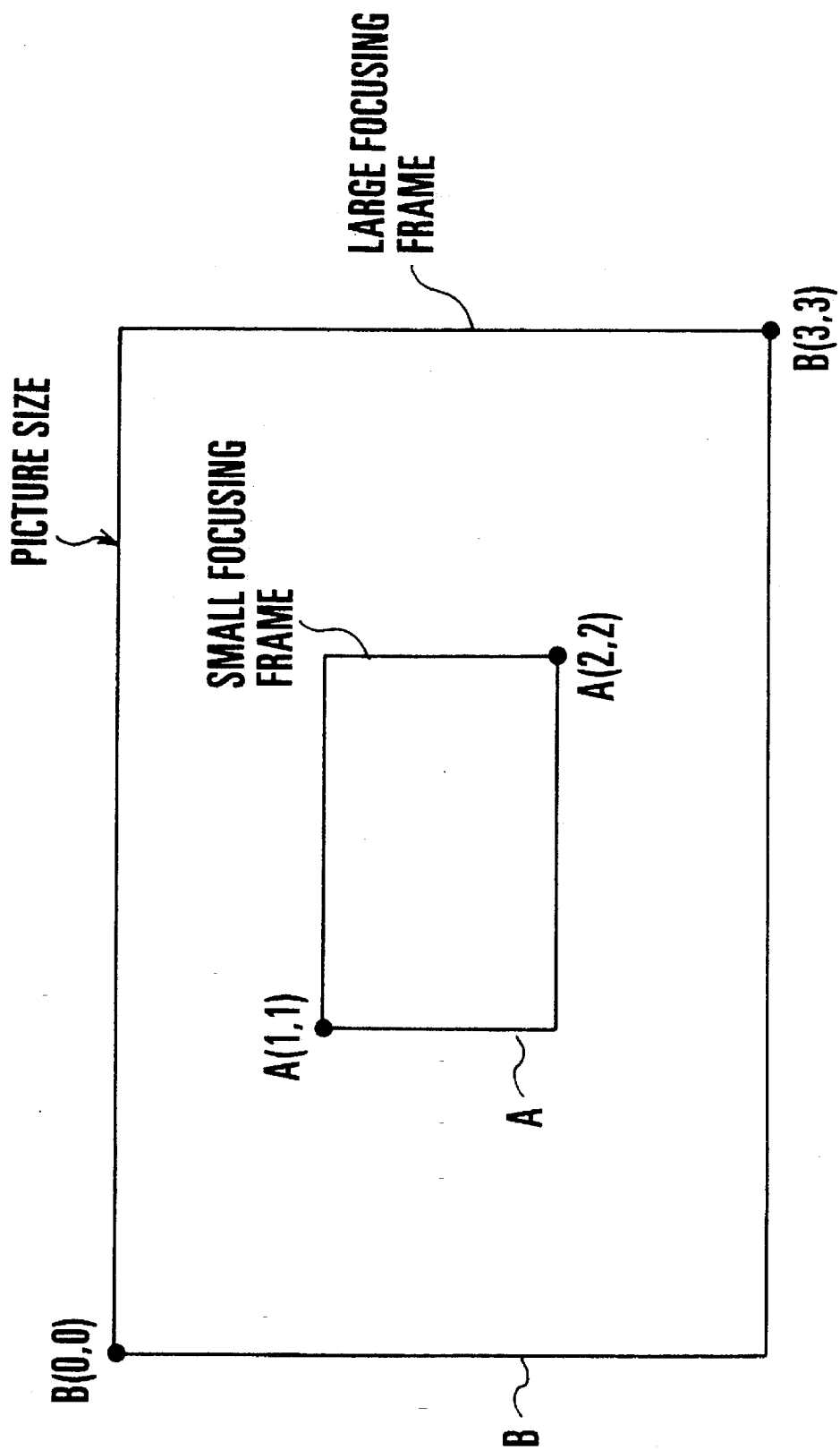
FIG. 5 is an illustration of a focusing frame of a camera in accordance with a second embodiment of the present invention.

FIG. 5 illustrates the size of the focusing frame of a video camera in accordance with the second embodiment of the present invention. In FIG. 5, A represents a small focusing frame; and B represents a large focusing frame. Values of x and y at A(x, y) and B(x, y) indicate positions in the horizontal and vertical directions, respectively. By changing these positions, it is possible to freely vary the size of the focusing frame within the range of the picture.

That is, it is possible to vary the focusing frame in a step manner. In a case in which the portrait mode or the close-up mode is detected in the first embodiment, if the positions of x and y are changed, for example, the positions are made smaller, more precise focusing is made possible.

As described above, according to the video camera of the first and second embodiments, even in a video camera capable of varying the size of the focusing frame, varying the size of the focusing frame is prohibited during the program AE control, for example, during the portrait mode or the close-up mode. As a result, an advantage can be realized, for example, focusing on the background can be prevented, and thus it is possible to precisely focus on an object to be photographed.

Next, an explanation will be given of the control of an iris, an AGC circuit, and a shutter speed in an automatic exposure for realizing the above-described program AE.

Figure 6:
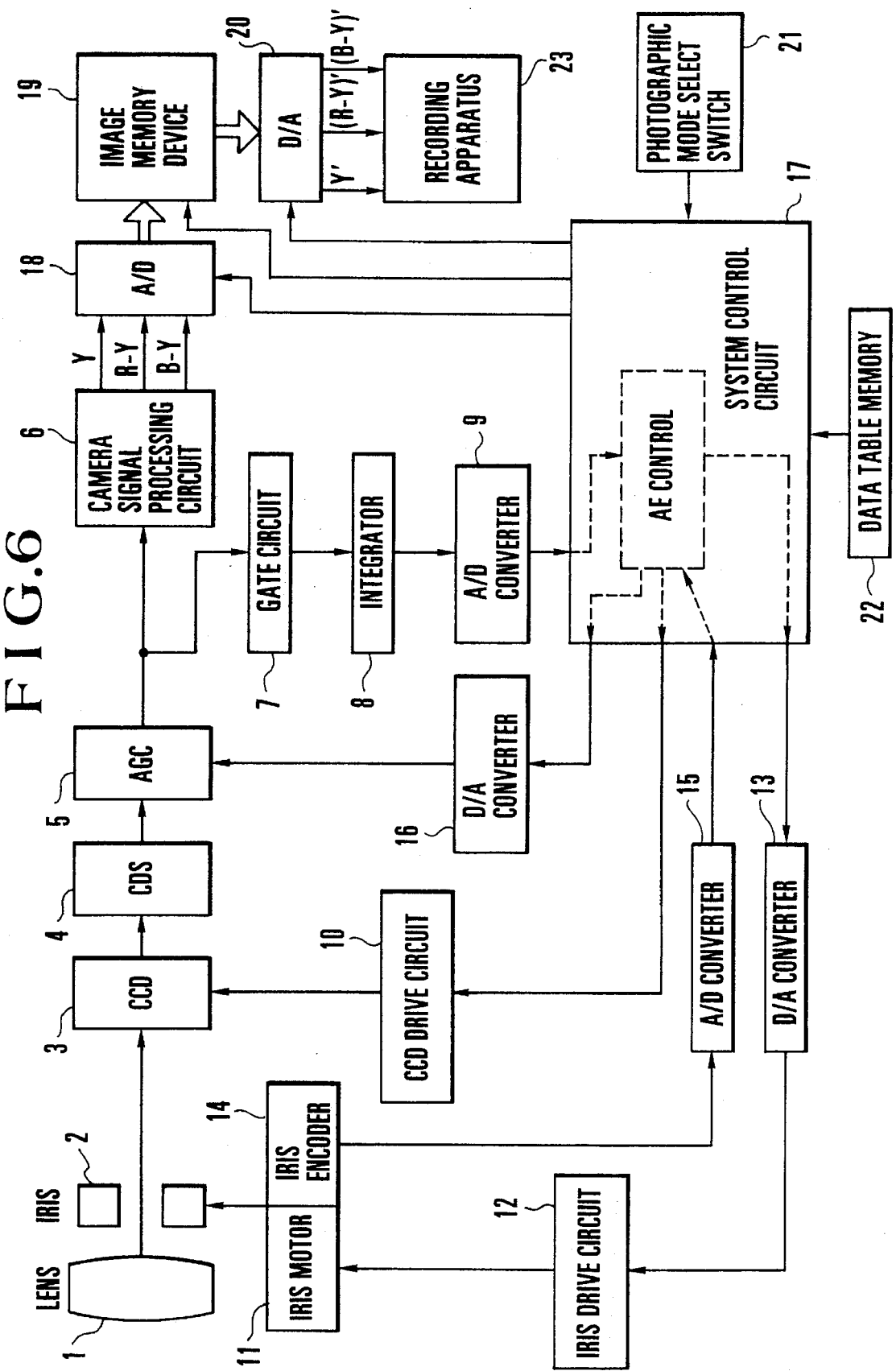
FIG. 6 is a block diagram illustrating the construction of a video camera in accordance with a third embodiment of the present invention.

FIG. 6 is a block diagram illustrating the construction of an imaging apparatus in accordance with the third embodiment of the present invention. Components in FIG. 6 indicated by reference numerals 1 to 17 are the same as those in FIG. 1, and thus an explanation thereof is omitted. Referring to FIG. 6, reference numeral 18 denotes an A/D converter for converting signals outputted from the camera signal processing circuit 6 from an analog to digital form; reference numeral 19 denotes an image memory device which stores signals outputted from the A/D converter 18 and outputs them in accordance with a signal from the system control circuit 17; reference numeral 20 denotes a D/A converter for converting an output from the image memory device 19 from a digital to analog form; reference numeral 21 denotes a photographic mode select switch operated by an operator to select a photographic mode, such as a portrait mode or a close-up mode; reference numeral 22 denotes a data table memory for prestoring various control characteristics information in each photographic mode which can be selected by the photographic mode select switch 21; and reference numeral 23 denotes a recording apparatus, such as a video tape recorder, for recording image information outputted from the D/A converter 20 on a recording medium such as an unillustrated video tape.

A luminance signal (Y) and color-difference signals (R-Y) and (B-Y), outputted from the camera signal processing circuit 6, are each converted into digital signals by the A/D converter 18 and supplied to the image memory device 19. The image memory device 19 stores and outputs image information input in accordance with a command from the system control circuit 17, thereby realizing a slow shutter. The image information outputted from the image memory device 19 is converted into analog signals by the D/A converter 20, again outputted to the recording apparatus 23 as a luminance signal (Y') and color-difference signals (R-Y)' and (B-Y)', and recorded on the recording medium.

In the above-described construction, exposure is controlled by a total of three types of exposure control means, namely, the iris 2, the AGC circuit 5, and the shutter speed (slow shutter) as a result of making the light accumulation time of the image sensor 3 longer.

The imaging apparatus of the third embodiment is constructed as described above. Next specific operations thereof will be explained step by step.

An electronic shutter for controlling the shutter speed by controlling the accumulation time of the image sensor 3 will now be explained.

Figure 7:
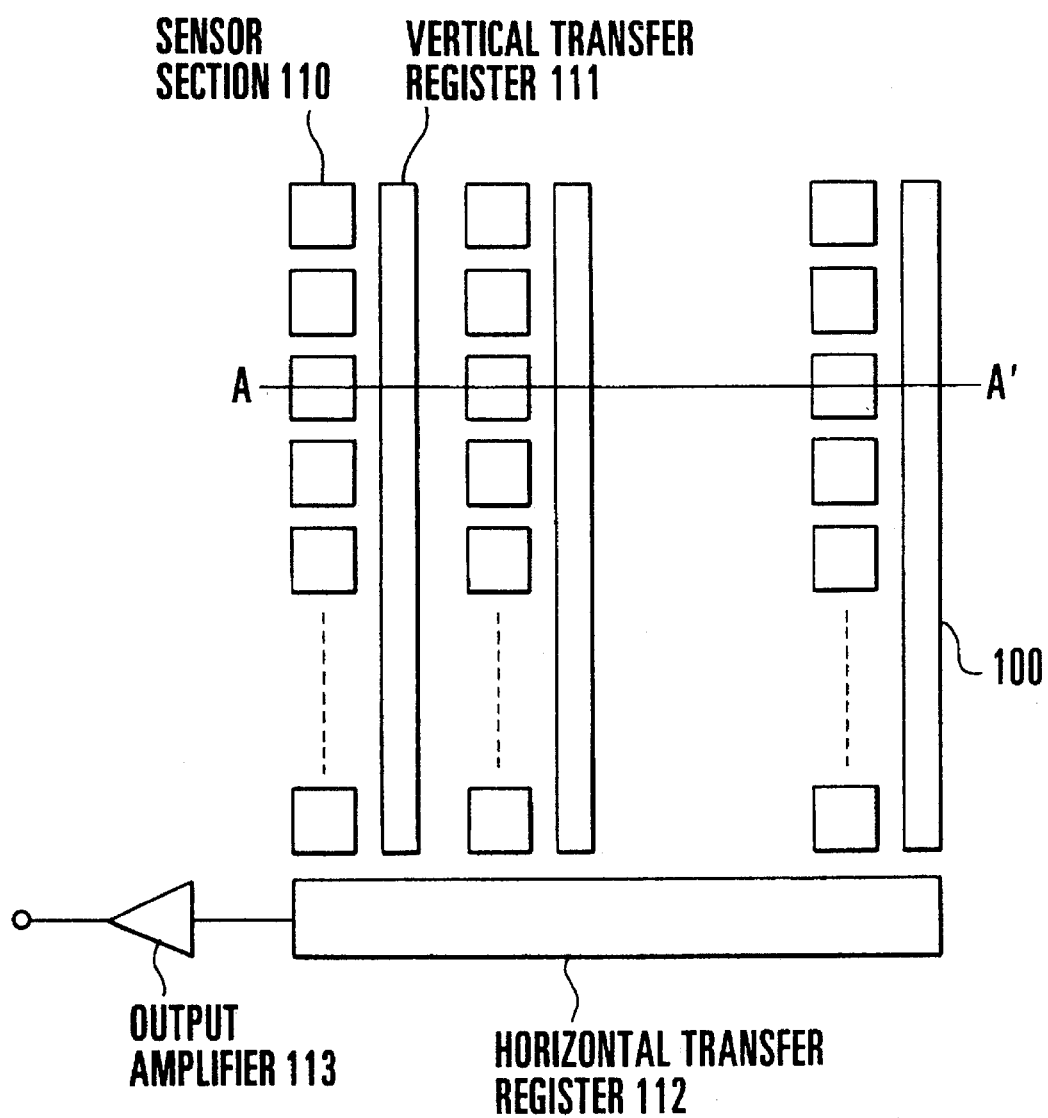
FIG. 7 is a conceptual view of a CCD in the apparatus of FIG. 6.
Figure 8:
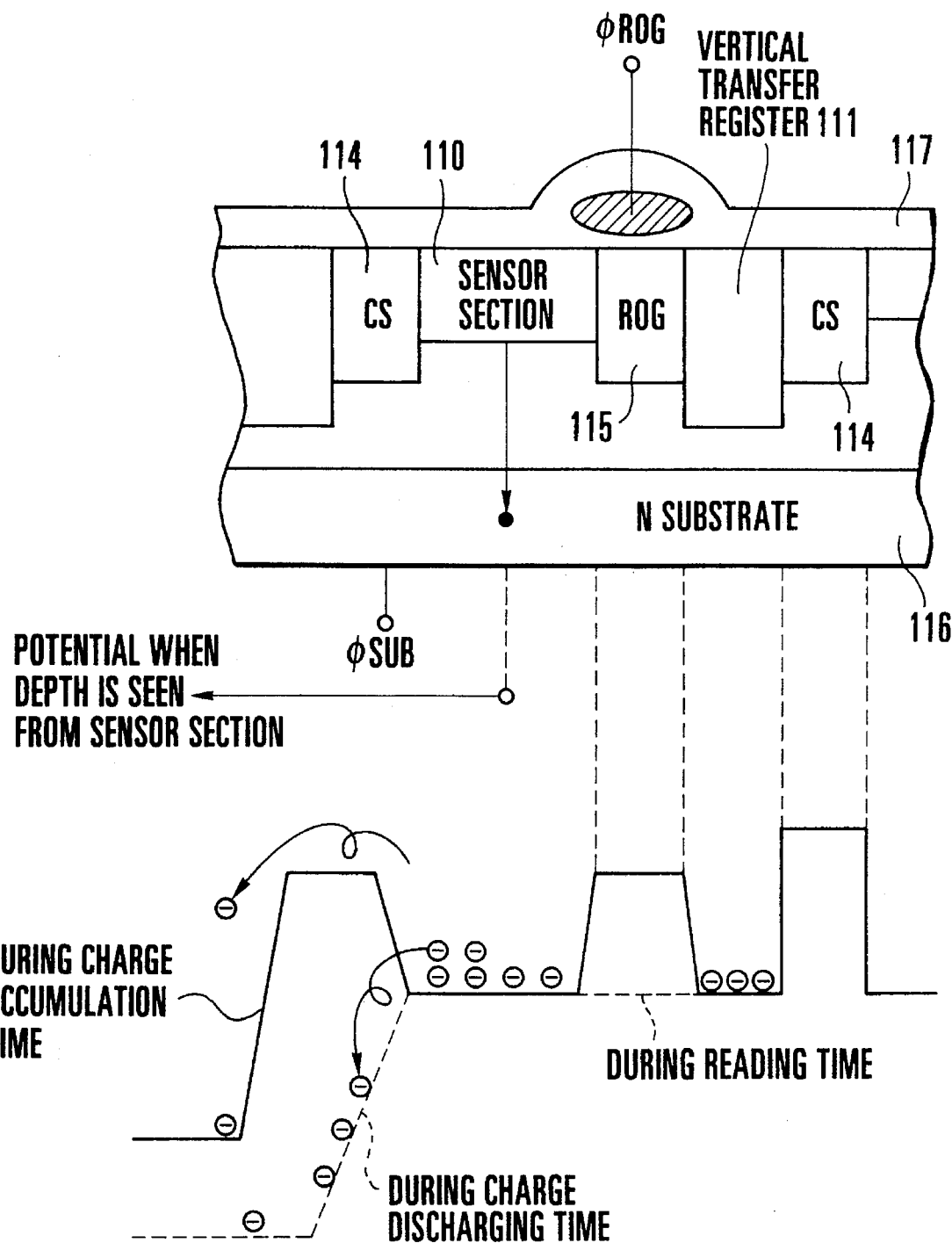
FIG. 8 is an illustration of the potential of the CCD of FIG. 7.

FIG. 7 is a conceptual view of a CCD, schematically illustrating the construction of a so-called interline transfer type CCD. FIG. 8 is sectional view, taken along the line A—A' of FIG. 7 and an illustration of the potential of the CCD. In FIGS. 7 and 8: reference numeral 110 denotes a sensor section or sensor element for performing photoelectric conversion; reference numeral 111 denotes a vertical transfer register; reference numeral 112 denotes a horizontal transfer register; reference numeral 113 denotes an output amplifier; reference numeral 114 denotes a channel stop (CS) for separating pixels; reference numeral 115 denotes a readout gate (ROG) for transferring the charge accumulated in the sensor element 110 to the vertical transfer register 111; reference numeral 116 denotes a substrate; and reference numeral 117 denotes an oxide film.

Figure 9:
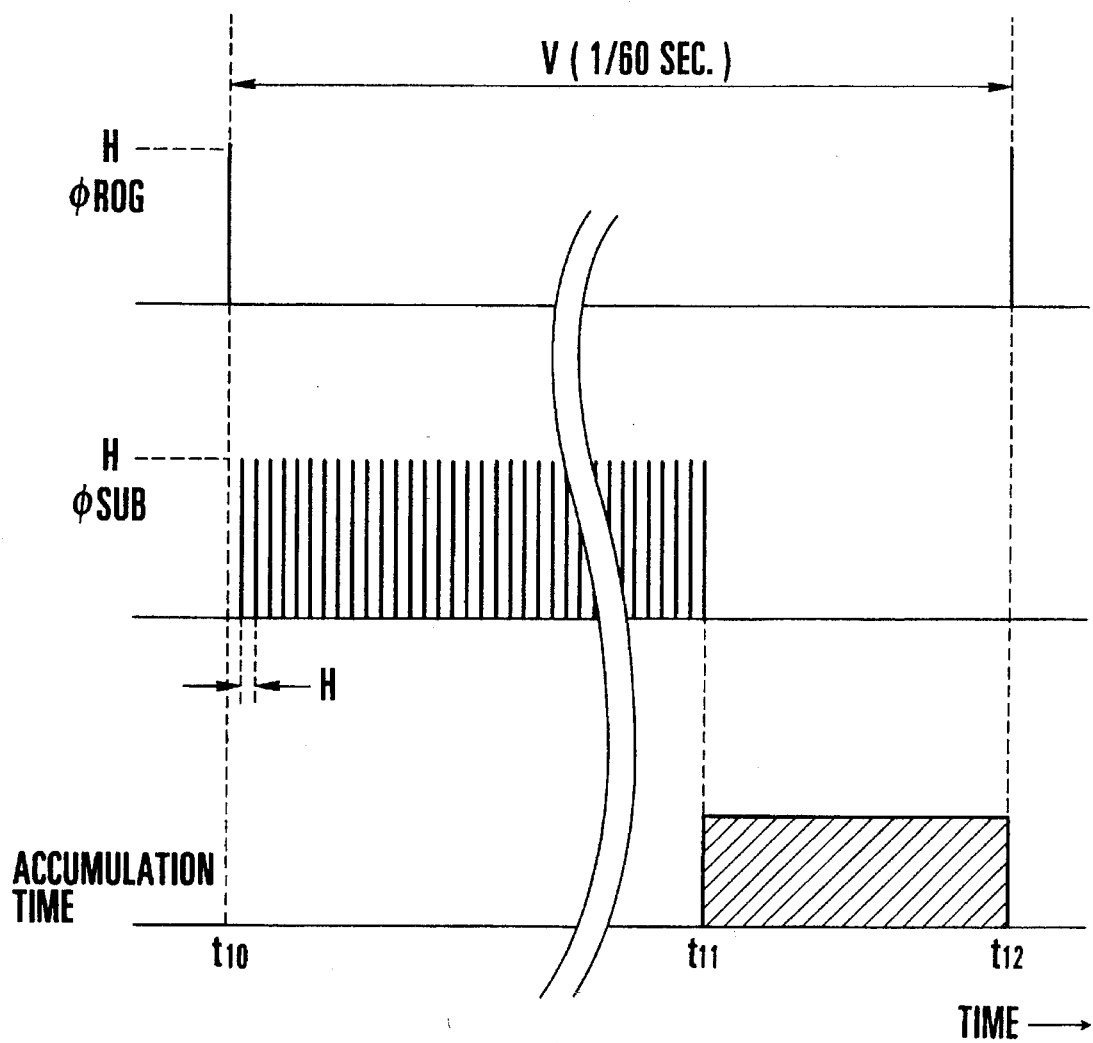
FIG. 9 is a timing chart illustrating the operation for reading the CCD of FIG. 7 within one field.

FIG. 9 illustrates pulses, described below, in one field of a standard television signal. φROG denotes a pulse applied to the readout gate 115. When the pulse reaches a logical level "H", the potential of the readout gate 115 is lowered, and the charge of the sensor element 110 is transferred to the vertical transfer register 111. A discharge pulse φSUB is a pulse applied to the substrate 116. When this pulse reaches "H", the charge accumulated in the sensor element 110 is discharged (removed) outside through the terminal φSUB. The charge (which will be described later) within one field, accumulated in the sensor element 110, is shown in the hatched area of the lower portion of FIG. 9.

Next, the operation of the electronic shutter will be explained.

Figure 10:
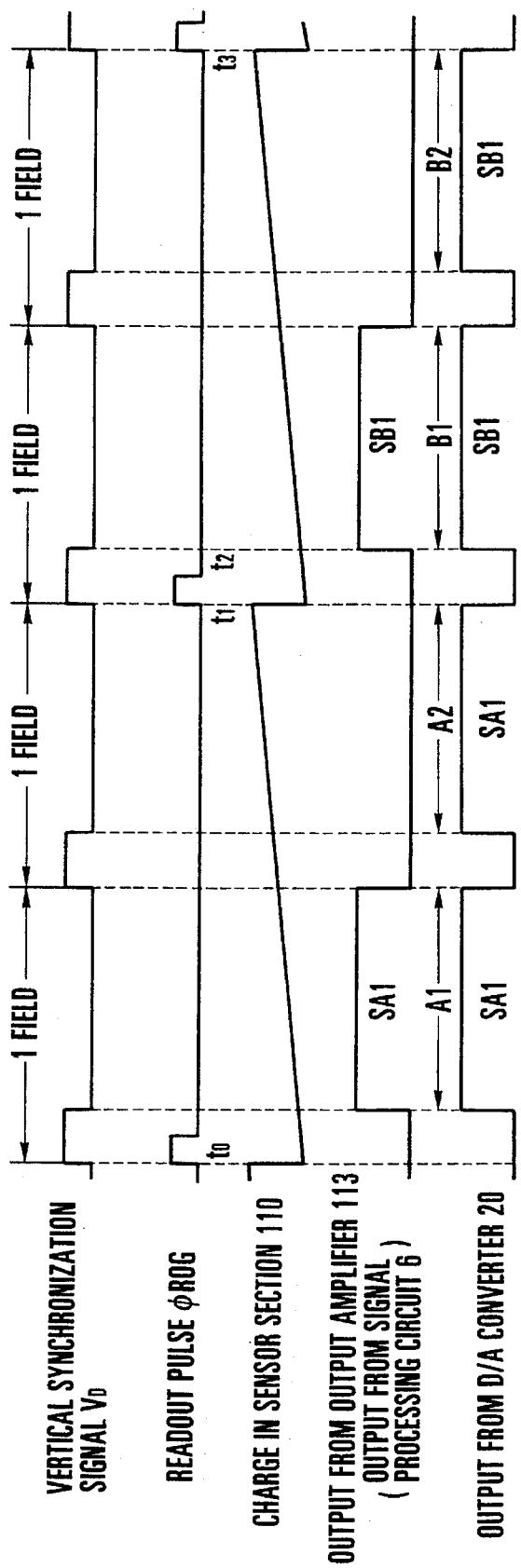
FIG. 10 is a timing chart for reading electric charges from the CCD of the apparatus of FIG. 6.

FIG. 10 is a timing chart during frame reading, schematically illustrating signals from each section. In this figure, a case in which the shutter speed is set at 1/30 (sec.) is shown. During frame reading, the exposure time is twice as long as during one field period. In FIG. 10, a vertical synchronization signal $V_D$ denotes a timing at which a charge is transferred from the sensor element 110 to the vertical transfer register 111. φROG is a reading pulse for transferring the charge accumulated in the sensor element 110 to the vertical transfer register 111.

As shown in FIG. 10, when the pulse φROG is added once in every two-field period, the charge in the sensor element 110, assuming time t0 to be the origin, is accumulated for approximately two fields and then transferred to the vertical transfer register 111 at time t1. Thereafter, the charge is transferred to the horizontal transfer register 112 at a predetermined timing, and outputted to the CDS circuit 4 through the output amplifier 113.

In FIG. 10, during one field period (B1 period) immediately after the pulse φROG is applied, the charge accumulated in the sensor element 110 from time t0 to t1, that is, the charge accumulated for approximately two fields, is outputted through the output amplifier 113 as a signal (SB1). However, since the pulse φROG is not applied during the next single field period (B2 period), an empty signal is outputted.

Accordingly, the A/D converter 18 is driven by the CCD drive circuit 10 shown in FIG. 6 immediately after the pulse φROG is generated. The charge accumulated over approximately a period of two fields, outputted from the signal processing circuit 6, is stored in the image memory device 19 and outputted to the D/A converter 20 (B1 period). During the next single field (B2 period), the signals stored in the image memory device 19 in the B1 period are outputted to the D/A converter 20 (B2 period). Therefore, as regards the output from the D/A converter 20, as shown in FIG. 10, the same signals will be outputted over two continuous fields.

As described above, when an exposure time of one or more fields is required because of inadequate-illuminance of the object or the like, and if, for example, the pulse φROG is added in every two-field period instead of in every field, the exposure time of the sensor element 110 becomes suddenly twice as long as during the single field period, the shutter speed becoming 1/30 (sec.). Thus, a slow shutter speed is realized.

Next referring to FIGS. 9 and 11, an explanation will be given of fine exposure compensation which is performed in accordance with the brightness of an object by varying the exposure time continuously in a long exposure in a period of one or more fields required in the case of inadequate-illuminance of an object or the like.

This method is performed instead of suddenly switching the exposure time to 1/30 (sec.).

In FIG. 9, the reading pulse φROG is within the vertical retrace period, and the discharge pulse φSUB is within the horizontal retrace period. After the charge of the sensor element 110 is read out at time t10, the next period starts. Since φSUB reaches "H" within the horizontal retrace line period by the time t11, the charge from time t10 to t11 is not left in the sensor element 110. Since φSUB is at the "L" level from time t11 to t12, the charge during this period is accumulated in the sensor element 110, and transferred to the vertical transfer register 111 by the pulse φROG (="H") at time t12. As a result, the exposure time in this case becomes (t12 - t11).

Figure 11:
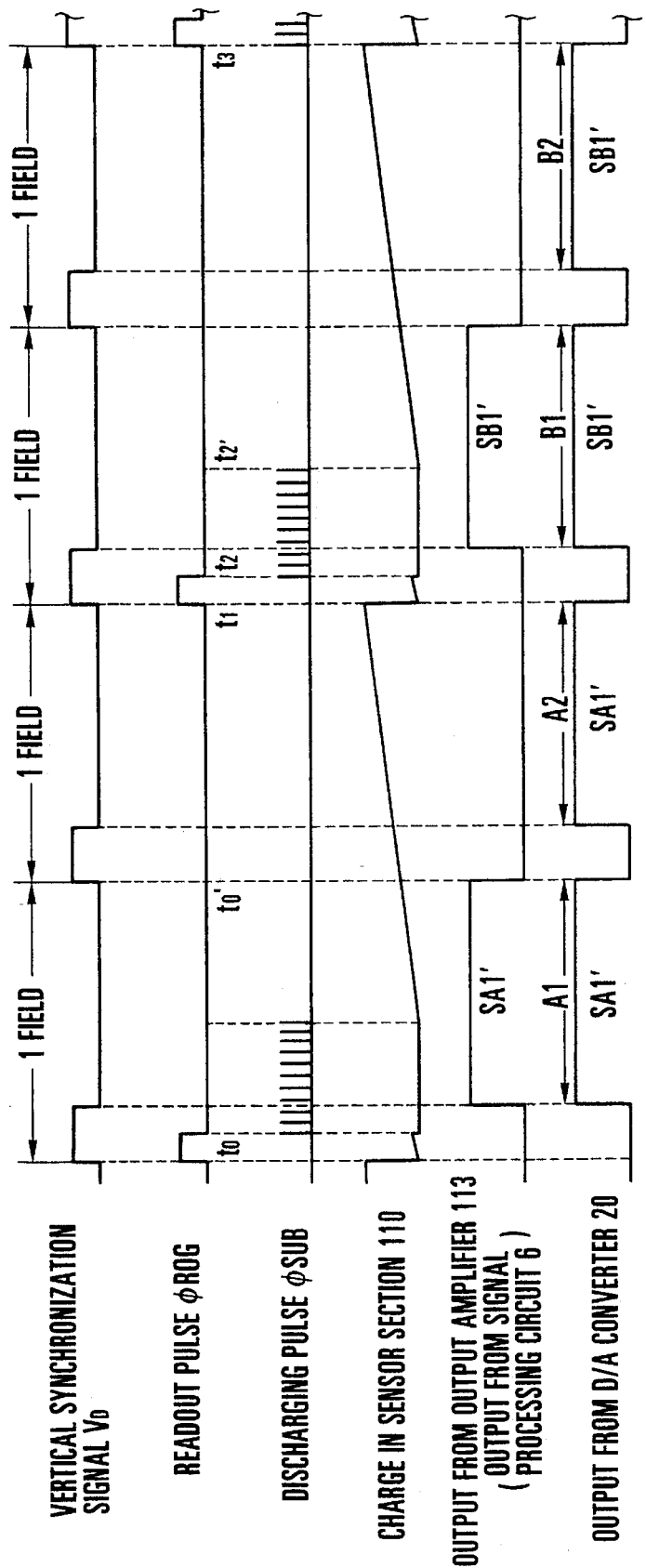
FIG. 11 is a timing chart for another method of reading charges from the CCD in the apparatus of FIG. 6.

FIG. 11 is a schematic illustration of the operation of the exposure compensation, illustrating signals of each section when a discharging pulse φSUB is applied to the CCD 3 from the time t0 when the charge begins being accumulated in the sensor element 110 to time t0', in a case where the shutter speed is 1/30 (sec.) shown in FIG. 10.

Since, as shown in the figure, the charge of the sensor element 110 is removed by the discharging pulse φSUB during the period from time t0 to t0', a practical exposure time is from time t0' to t1, after which an output from the D/A converter 20 is as shown in FIG. 11 by the same operation as that described above in the prior art. Therefore, by properly varying the time t0' at which the operation of the discharging means terminates in accordance with the brightness of the object, the exposure time (t1 - t0') of a period of one or more fields can be varied continuously.

As a result, since the exposure time can be varied continuously even in a long exposure over a period of one or more fields, fine exposure compensation can be performed in accordance with the brightness of the object at the same shutter speed (here, a slow shutter of 1/30 sec.) even if the object is inadequately illuminated. Although an example using a CCD has been explained, another solid-state image sensor may be used.

Next, an explanation will be given of the overall exposure control of the imaging apparatus in which proper exposure at a slow shutter speed is possible.

An optical image from the photographic lens 1 is photo-electrically converted by the image sensor 3 through the iris 2. The image passes through the CDS circuit 4 and and the AGC circuit 5, forming video signals, and the video signals are sent to the camera signal processing circuit 6. As regards the signal for exposure control, an exposure control system for iris control is formed of a closed loop, in which a luminance signal outputted from the AGC circuit 5 is gated by the gate circuit 7, integrated by the integrating circuit 8, passed through the A/D converter 9, received by the system control circuit 17, and the iris drive circuit 12 is controlled so that the level of the signal is kept within a predetermined range. The drive current outputted to the iris motor 11 is controlled, thereby varying the aperture amount of the iris 2.

The exposure control system based on the AGC circuit 5, similar to the exposure control system based on the iris 2, is formed of a closed loop in which the gain level of the AGC circuit 5 is controlled by the system control circuit 17 so that the output level of the A/D converter 9, received by the system control circuit 17, is kept within a predetermined range.

The exposure control system based on the shutter speed, similar to the exposure control system based on the iris 2, is formed of a closed loop in which the drive circuit 10 for the image sensor 3 and the image memory device 19 are controlled by the system control circuit 17 so that the level received by the system control circuit 17 is kept within a predetermined range.

In these exposure controls, when an operator selects a photographic mode from the photographic mode select switch 21, each set value of the exposure control system is read out in accordance with the selected photographic mode from the data table memory 22, and the characteristics of the exposure control system are set on the basis of this information.

When a photographic mode to be described below (for example, a full-auto mode adaptable for the largest number of photographic conditions) is selected, it is possible to take a photograph of high quality even if the object has low illuminance. In connection with this, actual exposure control for a lowly-illuminated object during the full-auto mode in the photographic mode will be explained.

Referring to the program diagram of FIG. 12, an explanation will be given of how three types of exposure control means of the shutter speed, the iris 2, and the AGC circuit 5 are controlled in accordance with illuminance. This program chart is stored in the data table memory 22, the data table of which will be explained reference to FIG. 15.

Figure 12:
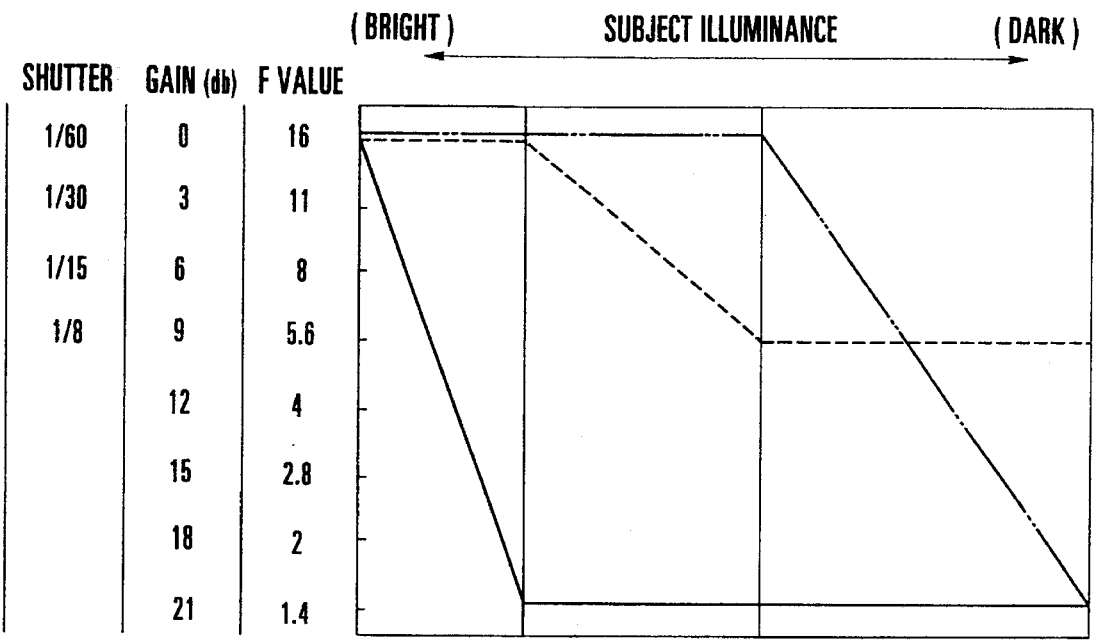
FIG. 12 is an illustration of control characteristics of the exposure control in the third embodiment of the present invention.

In FIG. 12, the horizontal axis indicates the illuminance of the object; and the vertical axis indicates the set values of the iris, the shutter speed, and the gain of each exposure control means. As is clear from FIG. 12, each exposure control means is divided into three areas A, B and C in accordance with the illuminance of the object. In other words, the exposure operation is controlled by combining the three types of exposure control means of the iris, the shutter speed, and the AGC gain in accordance with the illuminance of the object.

In area A, the shutter speed is fixed to 1/60 (sec.) (1/50 seconds in PAL), and the gain of the AGC circuit 5 is fixed to 0 dB, exposure control being performed only by the amount of aperture of the iris 2. In area B, the iris 2 is fixed to a full aperture value, and the gain of the AGC circuit 5 is fixed to 0 dB. By changing the discharging pulse φSUB between reading clock signals of the image sensor 3 in order to control the amount of charge accumulated as described earlier, it is possible to continuously vary the shutter speed in accordance with illuminace during the time when the shutter speed is 1/60 (sec.) until it is 1/8 (sec.), thus the exposure being controlled by the electronic shutter. In area C, the iris 2 is fixed to the full aperture value, and the shutter speed is fixed to 1/8 (sec.), thus the exposure being controlled only by the AGC circuit 5.

The data table in the full-auto mode is formed as shown in FIG. 15. As regards the program chart characteristics in each of the iris, the shutter, and the AGC gain, an attribute (a function or a constant value), data format (a threshold value, map format, definition using numerical values, definition using codes or the like) and actual data are stored for each parameter. As a result of reading these data into the system control circuit 17, the program chart in FIG. 12 is set.

Other set information is stored in the data table. In FIG. 15, when an image plane is divided into a plurality of photometric areas, "AE weighting" stores data on the weighting for each photometric area in a map format. As shown in FIG. 15, the picture is divided into 16 portions, the weighting in the central portion thereof is set at "1", and the weighting in the periphery thereof is set at "0.5". This is what is commonly called a center-weighted photometric method.

"AE reference value" indicates target reference values when exposure control is performed so that the level of the image signals becomes constant. In addition to this, the presence or absence of image quality adjustment and image effects processing, such as gamma characteristics are varied in accordance with the photographing conditions or fading effect is performed, is set beforehand. In this embodiment, it is set at "NORMAL", indicating that no special image quality adjustment or image effects processing is required.

Figure 13:
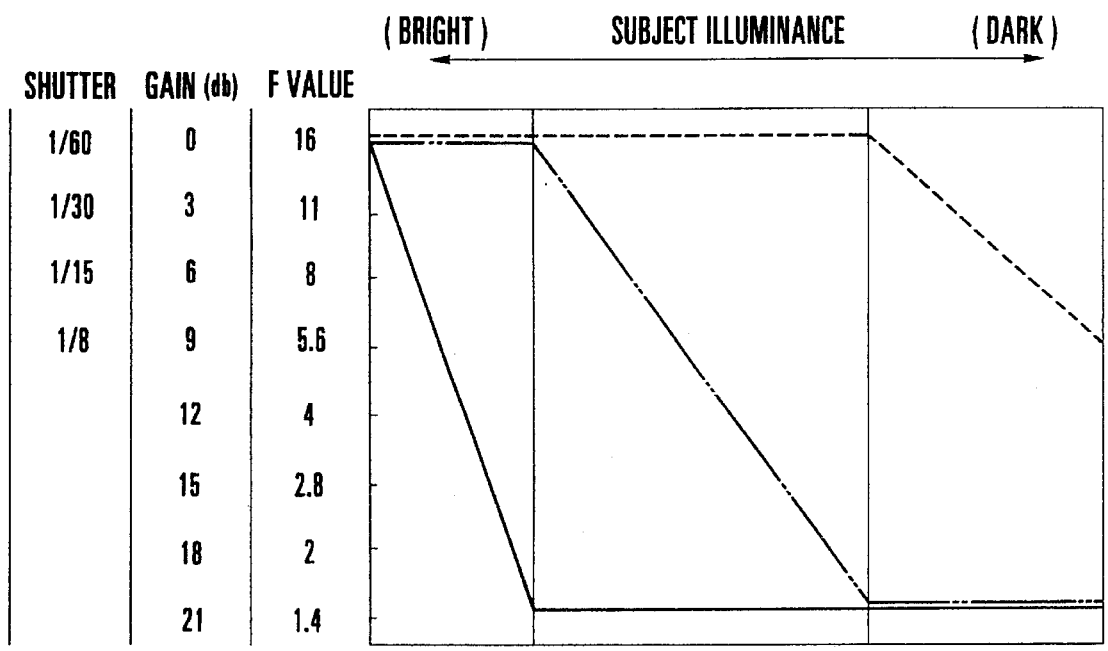
FIG. 13 is an illustration of other control characteristics of the exposure control in the third embodiment of the present invention.

Although in this embodiment, exposure is controlled by the iris, the slow shutter, and the AGC circuit, in that order, according to the descending order of the brightness of the object, as shown in FIG. 13, the order may be changed to that of the iris, the AGC circuit, and the slow shutter. The operation is performed as shown in FIG. 13, and an explanation thereof is omitted.

Figure 14:
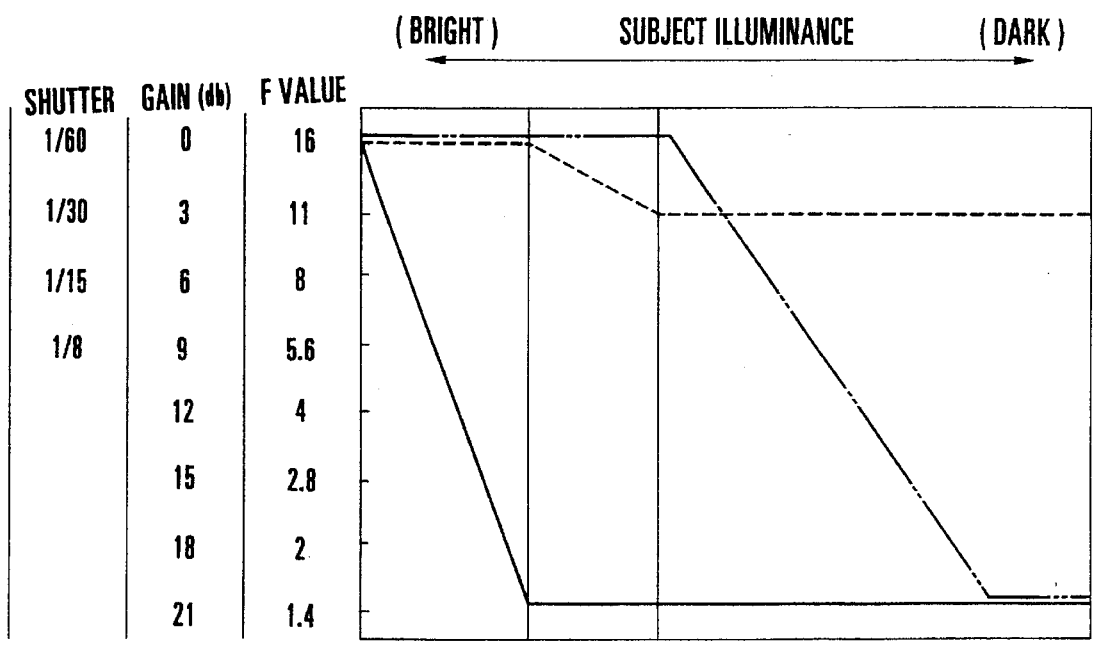
FIG. 14 is an illustration of further control characteristics of the exposure control in the third embodiment of the present invention.

Although in the above-described embodiments, the photographic mode in which exposure is continuously controlled in the slow shutter speeds from 1/60 (sec.) to 1/8 (sec.) has been explained, the photographic mode, such as the portrait mode, in which the operation of the slow shutter is changed from 1/60 (sec.) to 1/30 (sec.), is included in the plurality of photographic modes which can be selected by the photographic mode select switch 21. This is shown in FIG. 14.

As described above, according to the imaging apparatus in accordance with the third embodiment, problematical S/N deterioration can be prevented by a method in which a photographic mode in which exposure is controlled by a shutter speed at less than a field frequency is provided and these modes are made selectable before the gain of the AGC circuit 5 is increased, which causes the S/N deterioration which occurs when illuminance is inadequate.

In addition, since the shutter speed of an electronic shutter which forms one of the exposure control means, can be varied continuously in a slow shutter speed longer than a one-field period in order to perform program control together with other exposure control parameters, exposure control finer than the prior art is made possible, which compensates changes in the photographic environments.

In this way, proper exposure control is made possible in the programmed AE mode, and the focusing frame is not varied as described above, making it possible to precisely focus on an object. In short, proper exposure control and precise focusing are made possible in each photographic mode.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. An imaging apparatus comprising:
   (a) image pickup means for receiving an object image;
   (b) automatic focusing means for controlling said image pickup means so as to automatically focus on said object image based on an image signal corresponding to a predetermined area within one frame, area changing means for automatically changing a size and/or position of said area according to a condition of said object image;
   (c) mode switching means for switching said apparatus between at least a portrait mode and a non-portrait mode; and
   (d) inhibit means for inhibiting changing of the size and/or position of said area by said area changing means when in said portrait mode.

2. An imaging apparatus according to claim 1, wherein a size of a focusing frame of said automatic focusing means is changed between a plurality of respectively different sizes at a predetermined timing during said non-portrait mode, and said focusing frame size is not changed during said portrait mode.

3. An imaging apparatus according to claim 2, wherein said plurality of respectively different sizes includes at least first and second sizes, said second size being larger than said first size, said focusing frame size being maintained at said first size in said portrait mode.

4. An imaging apparatus according to claim 1, further comprising:
   gain control means for controlling the level of image signals from said image pickup means; and
   shutter speed control means for controlling the shutter speed of said image pickup means on the basis of the image signals outputted from said gain control means.

5. An imaging apparatus according to claim 4, wherein said image pickup means comprises means for converting light incident thereon into an electrical signal and light amount adjusting means for controlling the amount of light incident on said converting means, and further comprising control means for controlling said light amount adjusting means, said gain control means and said shutter speed control means.

6. An imaging apparatus according to claim 5, wherein said control means cojointly controls said light amount adjusting means, said gain control means and said shutter speed control means.

7. An imaging apparatus, comprising:
   (a) image pickup means for receiving an object image;
   (b) automatic focusing means for controlling said image pickup means so as to automatically focus on said object image based on an image signal corresponding to a predetermined area within one frame, area changing means for automatically changing a size and/or position of said area according to a condition of said object image;
   (c) mode switching means for switching said apparatus between at least a close-up mode and a non-close-up mode; and
   (d) inhibit means for inhibiting changing of the size and/or position of said area by said changing means when in said close-up mode.

8. An imaging apparatus according to claim 7, wherein a size of a focusing frame of said automatic focusing means is changed between a plurality of respectively different sizes at a predetermined timing during said non-close-up mode, and said focusing frame size is not changed during said close-up mode.

9. An imaging apparatus according to claim 8, wherein said plurality of respectively different sizes includes at least first and second sizes, said second size being larger than said first size, said focusing frame size being maintained at said first size in said close-up mode.

10. An imaging apparatus according to claim 7, further comprising:

gain control means for controlling the level of image signals from said image pickup means; and shutter speed control means for controlling the shutter speed of said image pickup means on the basis of the image signals outputted from said gain control means.

11. An imaging apparatus according to claim 7, wherein said image pickup means comprises means for converting light incident thereon into an electrical signal and light amount adjusting means for controlling the amount of light incident on said converting means, and further comprising control means for controlling said light amount adjusting means, said gain control means and said shutter speed control means.

12. An imaging apparatus according to claim 11, wherein said control means cojointly controls said light amount adjusting means, said gain control means and said shutter speed control means.

* * * * *

UNITED STATES PATENT AND TRADEMARK OFFICE
CERTIFICATE OF CORRECTION

PATENT NO. : 5,604,537
DATED : February 18, 1997
INVENTOR(S): Yamazaki et al.

Figure 1:
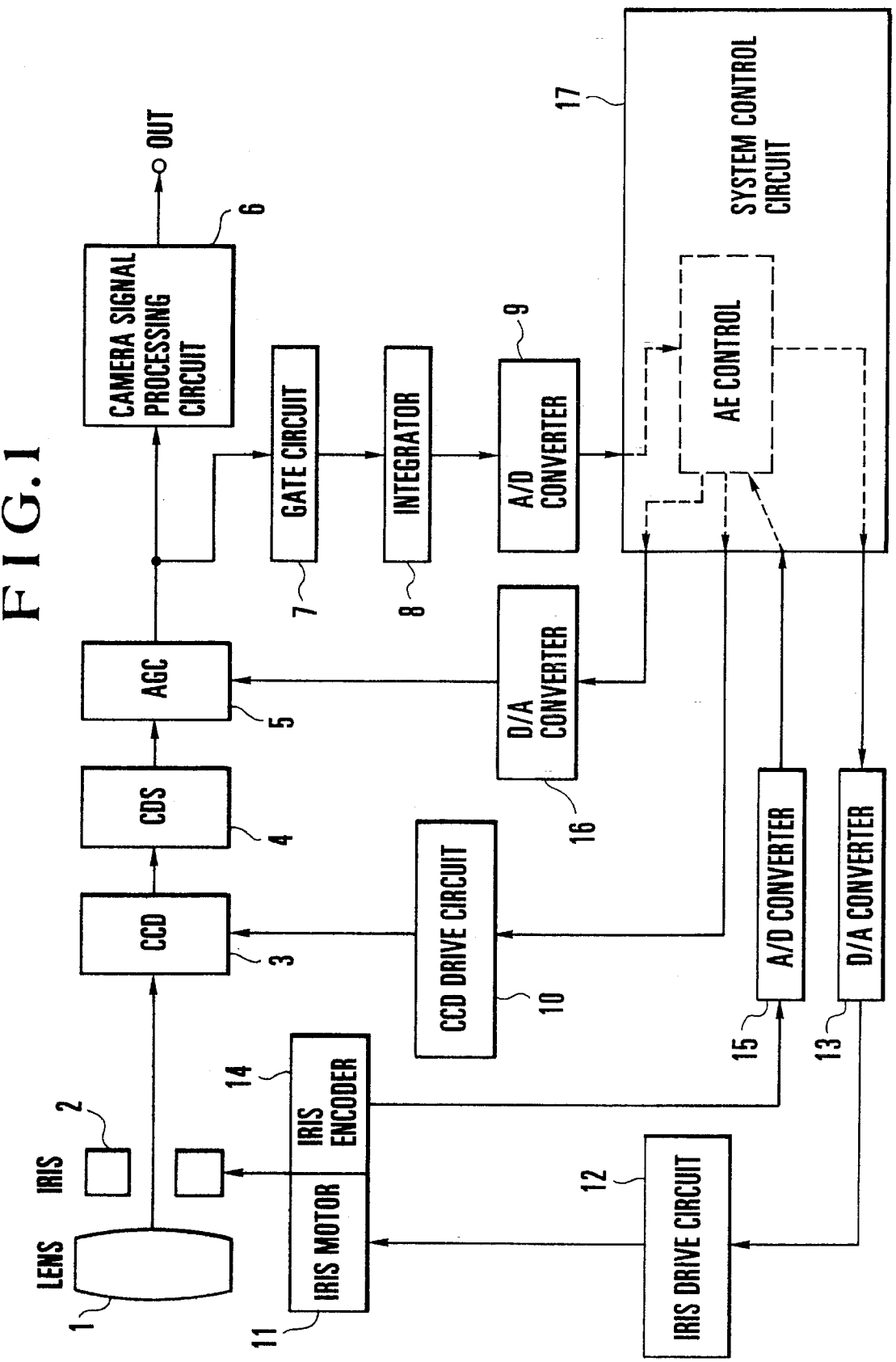
FIG. 1 is a block diagram illustrating the construction of an exposure control device in a conventional video camera.
Figure 2:
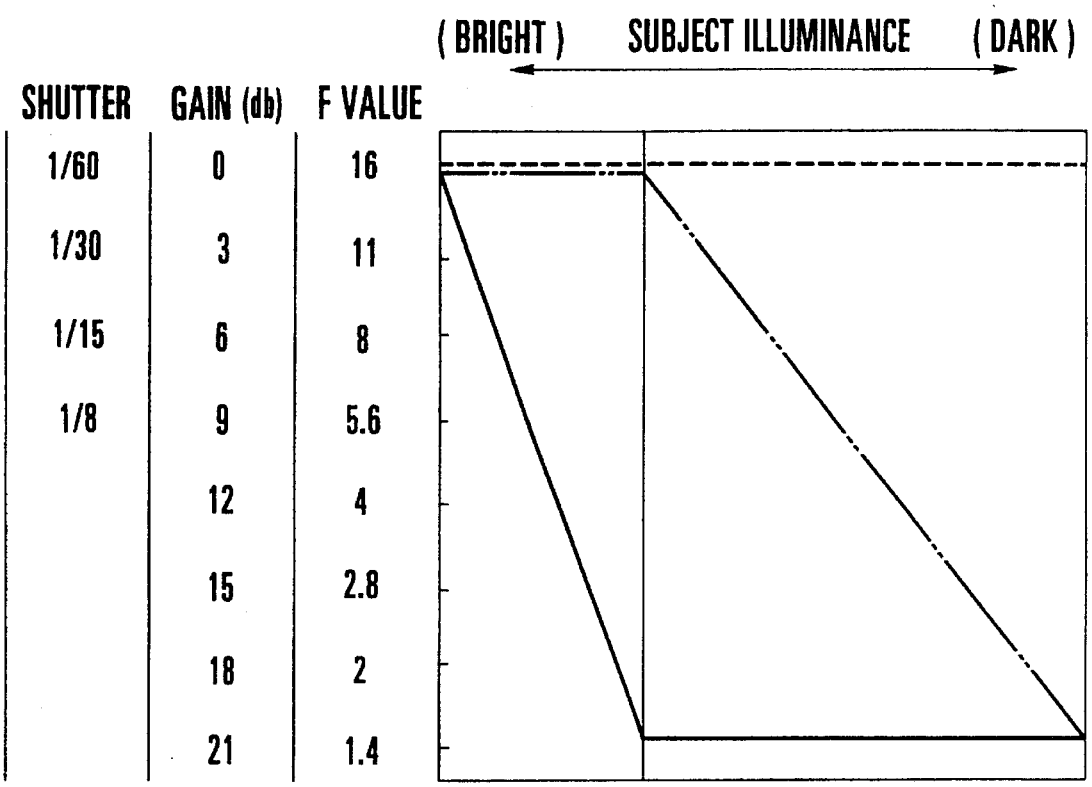
FIG. 2 is an illustration of control characteristics in the conventional exposure control.

It is certified that error appears in the above-identified patent and that said Letters Patent is hereby corrected as shown below:

Col. 2, line 34, delete "FIG. 1;" and insert -- FIG. 1: --.
Col. 6, line 43, delete "amplifier" and insert -- amplified --.
Col. 6, line 43, delete "amplified 320" and insert -- amplifier 320 --.
Col. 8, line 1, delete "cause" and insert -- causes --.
Col. 9, line 14, delete "FIG. 6," and insert -- FIG. 6: --.

Signed and Sealed this

Thirty-first Day of March, 1998

Attest:

BRUCE LEHMAN

Attesting Officer

Commissioner of Patents and Trademarks